A. MOSES.
GAS ENGINE VALVE.
APPLICATION FILED OCT. 7, 1919.

1,365,531.

Patented Jan. 11, 1921.

WITNESS:

INVENTOR
Adolph Moses
BY
ATTORNEYS.

UNITED STATES PATENT OFFICE.

ADOLPH MOSES, OF MOUNT VERNON, NEW YORK.

GAS-ENGINE VALVE.

1,365,531.  Specification of Letters Patent.  Patented Jan. 11, 1921.

Application filed October 7, 1919. Serial No. 329,128.

*To all whom it may concern:*

Be it known that I, ADOLPH MOSES, a citizen of the United States of America, residing at Mount Vernon, New York, have invented a new and useful Gas-Engine Valve, of which the following is a specification.

My invention relates to certain new and useful improvements in engines of the internal combustion variety, and consists primarily in improving the construction and mode of operation of the valve mechanism therefor, in the manner hereinafter described.

It should be understood that I have shown my invention in only one of many forms since said invention is susceptible of a wide variety of modifications.

Figure 1:
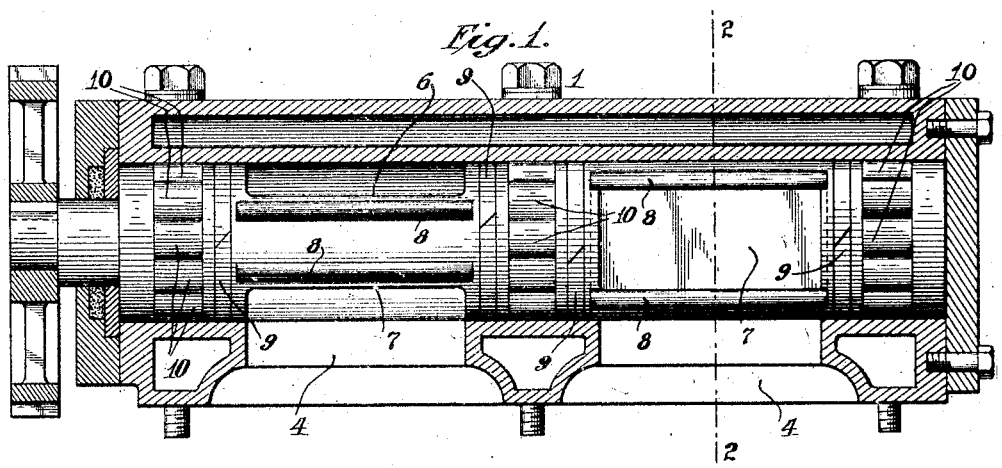
Figure 1 is a longitudinal vertical section through the valve chamber of an internal combustion engine showing the valve element in elevation.
Figure 2:
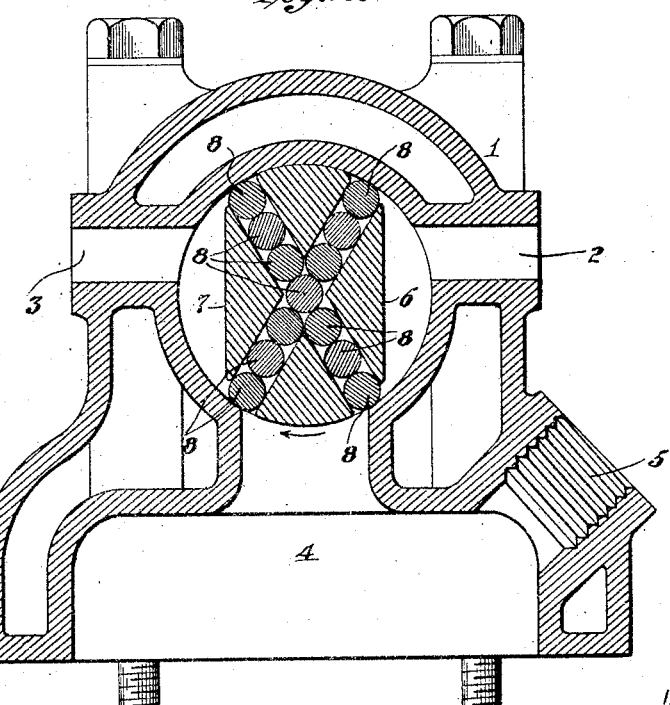
Fig. 2 is a relatively enlarged cross-section on the line 2—2 of Fig. 1.

In that form of my invention shown herein, 1 represents the cylinder head of an engine. In this particular instance, the engine is of the two-cylinder variety. A description of the valve in connection with one of said cylinders will suffice, since the valve for the other cylinder corresponds thereto, although it may be pitched at a different angle. The valve comprises a solid cylindrical body arranged to be revolved in a correspondingly shaped chamber in the cylinder head, said chamber being located between the inlet and exhaust ports therein. 2 represents an inlet port. 3 represents an exhaust port. 4 represents the combustion chamber. 5 represents the usual threaded opening for receiving the threaded end of an ordinary spark plug, not shown. The opposite sides of the valve body adjacent to the ports 2 and 3 are flattened off to form walls 6—7, Fig. 2. That part of the valve body between the ports 2 and 3 is slotted obliquely through from edge to edge, the slots crossing at the center portion. 8—8 are rollers arranged in the aforesaid slots, the same being so arranged that the four outside rollers will make a rolling contact bearing against the inner cylindrical surface of the valve chamber so as to form packings. The length of these rollers is slightly in excess of the length of the ports 2 and 3 so that when the valve is rotated the said rollers will be supported by the walls of the valve chamber when crossing the ports. 9—9 are packing rings of any suitable design which surround the body of the valve beyond the ends of the packing rollers 8—8. 10—10 are antifriction rollers for supporting the valve in the valve chamber so as to permit said valve to be turned therein with a minimum of friction. Any suitable additional packing devices may be provided, the particular form and arrangement being immaterial to this invention. The valve is rotated in any well known manner from the engine shaft at the proper time and speed, the particular means being immaterial to my invention.

Operation: As already observed, the elements 8—8 provide a rolling contact which serves as a packing to prevent gas leakage. The provision of a rolling contact in the valve simplifies the problem of lubrication, prevents sticking or seizing, prevents scoring the walls of the valve chamber, and tends to burnish and keep bright the surfaces of the moving parts, all of which assists in keeping down the temperature of the valve. In this particular instance, as the valve is turned in the direction of the arrow, the space adjacent to the wall 6 will put the inlet port 2 in communication with the interior of the cylinder 4 during the suction stroke. As soon as the valve has turned sufficiently far to cut off the port 2, the piston will ascend for the compression stroke. Before the valve has turned to a point where the space adjacent the wall 6 will reach the exhaust port 3, the piston will have completed the power stroke. At the end of the power stroke the space adjacent the wall 6 will uncover the exhaust port 3 and put the interior of the cylinder 4 in communication therewith to permit the burnt exhaust gases to be expelled. This cycle of operation is repeated excepting that the next inlet of gas and the next exhaust operation will be effected through the passage adjacent to the wall 7 of the valve which latter functions in the same manner as above described.

The valve element shown is constructed with a similar valve portion for each of the cylinders and hence one valve element will suffice for any number of cylinders. In the particular construction shown, the valve rotates at one-quarter engine speed. The two recesses in the valve adjacent to the two opposite flattened portions constitute in effect two separate valve passages for each valve, which alternately operate to admit and exhaust gas respectively. By this arrangement, there is no possibility of trapping and wasting intake gas in the valve passage. To secure this effect necessitates the slowing down of the valve relatively to the speed of the crank shaft so that each valve passage will remain in communication with the cylinder during the power stroke. This also makes a symmetrical valve in which the warm spots are symmetrically located and hence lessens the danger of warping. Again, by this arrangement, the highly desirable cooling effect of the inlet gas upon the parts of the valve exposed to the hot gases is obtained without the waste of good mixture.

While I have shown the opposite sides of the valve body cut away to form two independent and successively operable valve passages for each cylinder, it should be understood that the invention is not limited to the particular number of valve passages for each valve and that this number may be varied, in which event of course, the timing of the valve would be correspondingly varied.

What I claim is:

1. In an internal combustion engine, a valve casing, a valve having a slot therethrough rotatable in the casing, a plurality of rollers in said slot for providing an antifriction packing between said valve and casing at each end of said slot.

2. In a device of the character described, a valve casing, a valve having a slot therethrough rotatable in the casing, a plurality of rollers in said slot, one of said rollers being in rolling contact with said casing and with another of said rollers for providing an anti-friction packing between said valve and casing.

3. In a device of the character described, a valve casing, a valve having a pair of intersecting slots therethrough rotatable in said casing, rollers in said slots, some of said rollers engaging the casing and other rollers with a rolling contact.

4. In a device of the character described, a valve casing, a valve rotatable in said casing, a rolling packing between said valve and casing, and carried by one of said members, and means for providing an antifriction support for said rolling packing.

5. In a device of the character described, a valve casing, a valve rotatable in said casing, one of said members having a slot therein, a member in said slot forming a rolling packing between said valve and casing and a second member in said slot in rolling contact with said packing member.

ADOLPH MOSES.